(12) United States Patent
Burkhardt et al.

(10) Patent No.: US 7,310,801 B2
(45) Date of Patent: Dec. 18, 2007

(54) SERVICING A COMPONENT-BASED SOFTWARE PRODUCT THROUGHOUT THE SOFTWARE PRODUCT LIFECYCLE

(75) Inventors: Ryan Burkhardt, Redmond, WA (US); Jason Cohen, Seatac, WA (US); Stephen Lodwick, Covington, WA (US); Raj Jhanwar, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 10/641,800

(22) Filed: Aug. 15, 2003

(65) Prior Publication Data

US 2004/0034850 A1 Feb. 19, 2004

Related U.S. Application Data

(63) Continuation-in-part of application No. 09/561,389, filed on Apr. 27, 2000.

(51) Int. Cl.
*G06F 9/44* (2006.01)

(52) U.S. Cl. .................................................. 717/169

(58) Field of Classification Search ........ 717/120–122, 717/168–178
See application file for complete search history.

(56) References Cited

U.S. PATENT DOCUMENTS

| | | | |
|---|---|---|---|
| 5,142,680 A | | 8/1992 | Ottman et al. |
| 5,359,730 A | * | 10/1994 | Marron ....................... 717/169 |
| 5,469,573 A | | 11/1995 | McGill, III et al. |
| 5,499,357 A | * | 3/1996 | Sonty et al. ................. 710/104 |
| 5,555,416 A | | 9/1996 | Owens et al. |
| 5,579,508 A | * | 11/1996 | Yoshizawa et al. ......... 711/172 |
| 5,649,200 A | | 7/1997 | Leblang et al. |
| 5,713,024 A | | 1/1998 | Halladay |
| 5,794,052 A | | 8/1998 | Harding |
| 5,845,077 A | | 12/1998 | Fawcett |
| 5,878,408 A | * | 3/1999 | Van Huben et al. ............. 707/1 |
| 5,950,011 A | | 9/1999 | Albrecht et al. |
| 5,974,572 A | | 10/1999 | Weinberg et al. |
| 5,999,740 A | * | 12/1999 | Rowley ....................... 717/173 |
| 6,006,034 A | | 12/1999 | Heath et al. |
| 6,016,400 A | | 1/2000 | Day et al. |
| 6,038,399 A | * | 3/2000 | Fisher et al. ................. 717/178 |

(Continued)

FOREIGN PATENT DOCUMENTS

EP        0 817 014 A2     1/1998

(Continued)

OTHER PUBLICATIONS

Richard S. Hall et al. "A cooperative Approach to Support Software Deployment Using the Software Dock", May 1999, IEEE Computer Society Press, pp. 174-183.*

(Continued)

*Primary Examiner*—Wei Zhen
*Assistant Examiner*—Anna Deng
(74) *Attorney, Agent, or Firm*—Senniger Powers

(57) ABSTRACT

Updating component-based software product with files stored in a service package. The service package also includes a plurality of instruction sets each corresponding to a state or operating context of a component in the software product. A component installer determines the state of the component and applies the instruction set corresponding to the determined state to install the files.

37 Claims, 5 Drawing Sheets

U.S. PATENT DOCUMENTS

| | | |
|---|---|---|
| 6,073,214 A | 6/2000 | Fawcett |
| 6,080,207 A * | 6/2000 | Kroening et al. ............ 717/172 |
| 6,110,228 A | 8/2000 | Albright et al. |
| 6,138,179 A | 10/2000 | Chrabaszcz et al. |
| 6,157,928 A | 12/2000 | Sprenger et al. |
| 6,161,051 A | 12/2000 | Hafemann et al. |
| 6,188,779 B1 | 2/2001 | Baum |
| 6,199,204 B1 | 3/2001 | Donohue |
| 6,202,207 B1 | 3/2001 | Donohue |
| 6,223,345 B1 | 4/2001 | Jones et al. |
| 6,247,128 B1 | 6/2001 | Fisher et al. |
| 6,262,726 B1 | 7/2001 | Stedman et al. |
| 6,279,146 B1 * | 8/2001 | Evans et al. ................... 716/18 |
| 6,282,711 B1 | 8/2001 | Halpern et al. |
| 6,286,138 B1 | 9/2001 | Purcell |
| 6,292,941 B1 * | 9/2001 | Jollands ...................... 717/176 |
| 6,305,015 B1 * | 10/2001 | Akriche et al. ............. 717/168 |
| 6,314,565 B1 | 11/2001 | Kenner et al. |
| 6,327,617 B1 | 12/2001 | Fawcett |
| 6,367,072 B1 * | 4/2002 | Justice et al. ............... 717/168 |
| 6,377,958 B1 | 4/2002 | Orcutt |
| 6,378,128 B1 | 4/2002 | Edelstein et al. |
| 6,385,766 B1 | 5/2002 | Doran, Jr. et al. |
| 6,427,236 B1 | 7/2002 | Chamberlain et al. |
| 6,434,744 B1 | 8/2002 | Chamberlain et al. |
| 6,453,413 B1 | 9/2002 | Chen et al. |
| 6,463,584 B1 | 10/2002 | Gard et al. |
| 6,487,713 B1 * | 11/2002 | Cohen et al. ................ 717/105 |
| 6,493,871 B1 | 12/2002 | McGuire et al. |
| 6,512,526 B1 | 1/2003 | McGlothlin et al. |
| 6,532,474 B2 | 3/2003 | Iwamoto et al. |
| 6,560,614 B1 | 5/2003 | Barboy et al. |
| 6,564,215 B1 * | 5/2003 | Hsiao et al. ................... 707/8 |
| 6,598,223 B1 | 7/2003 | Vrhel, Jr. et al. |
| 6,681,323 B1 | 1/2004 | Fontanesi et al. |
| 6,711,624 B1 | 3/2004 | Narurkar et al. |
| 6,802,054 B2 * | 10/2004 | Faraj .......................... 717/128 |
| 6,832,373 B2 * | 12/2004 | O'Neill ....................... 717/171 |
| 2001/0027554 A1 * | 10/2001 | Imachi et al. ................... 717/3 |
| 2001/0029605 A1 | 10/2001 | Forbes et al. |
| 2001/0042112 A1 | 11/2001 | Slivka et al. |
| 2002/0049966 A1 | 4/2002 | Lin |
| 2002/0073398 A1 | 6/2002 | Tinker |
| 2002/0144248 A1 | 10/2002 | Forbes et al. |
| 2002/0156877 A1 | 10/2002 | Lu et al. |
| 2002/0174329 A1 | 11/2002 | Bowler et al. |
| 2002/0188941 A1 | 12/2002 | Cicciarelli et al. |
| 2002/0194398 A1 | 12/2002 | Bentley et al. |
| 2003/0046681 A1 | 3/2003 | Barturen et al. |
| 2003/0056102 A1 | 3/2003 | Aho et al. |
| 2003/0120678 A1 | 6/2003 | Hill et al. |
| 2003/0120688 A1 | 6/2003 | Hill et al. |
| 2003/0121024 A1 | 6/2003 | Hill et al. |
| 2003/0145317 A1 | 7/2003 | Chamberlain |
| 2003/0182652 A1 * | 9/2003 | Custodio .................... 717/122 |
| 2003/0233379 A1 | 12/2003 | Cohen et al. |
| 2004/0015857 A1 * | 1/2004 | Cornelius et al. ........... 717/120 |
| 2004/0070678 A1 | 4/2004 | Toyama et al. |
| 2004/0181790 A1 * | 9/2004 | Herrick ...................... 717/168 |
| 2004/0210653 A1 * | 10/2004 | Kanoor et al. .............. 709/223 |
| 2004/0215755 A1 * | 10/2004 | O'Neill ....................... 709/223 |
| 2004/0218902 A1 | 11/2004 | Yanagita |

FOREIGN PATENT DOCUMENTS

| | | |
|---|---|---|
| GB | 2 334 354 A | 2/1998 |
| WO | WO 99/49394 A1 | 9/1999 |
| WO | WO 99/59059 A1 | 11/1999 |

OTHER PUBLICATIONS

L. Bernstei et al. "Software Manufacturing", Jun. 1978, IEEE Press, p. 455-462.*

Satish Chandra et al., "Where is Time Spent in Message-Passing and Shared_Memory Programs?" Nov. 1994, ACM Press, ASPLOS-VI, vol. 29, 28 issue 11, 5, pp. 61-73.*

Chapter 4—Installing Windows 2000 Professional, Microsoft Windows 2000 Professional Resource Kit, 30 pages, Microsoft Corporation, 2001, U.S.A.

Chapter 5—Customizing and Automating Installations, Microsoft Windows 2000 Professional Resource Kit, 61 pages, Microsoft Corporation, 2001, U.S.A.

Zhang et al., "A Modeling Perspective of Image-Based Installation," Dell White Paper, pp. 1-13, Mar. 2002, U.S.A.

White Paper, "Microsoft Windows 2000 Server—Remote Operating System Installation," Microsoft Corporation, pp. i-iv, 1-41, 1999, U.S.A.

Hicks, Michael et al., "Dynamic Software Updating," 2000, 11 pages.

Richardson, Robert, "Components Battling Components," available at http://www.byte.com/art/9711/sec6/art6.htm, Nov. 1997, 10 pages.

* cited by examiner

SERVICING A COMPONENT-BASED SOFTWARE PRODUCT THROUGHOUT THE SOFTWARE PRODUCT LIFECYCLE

CROSS-REFERENCE TO RELATED APPLICATION

This application is a continuation-in-part of co-pending U.S. patent application Ser. No. 09/561,389, filed Apr. 27, 2000, entitled "A COMPONENTIZED OPERATING SYSTEM," which is hereby incorporated herein by reference in its entirety for all purposes.

TECHNICAL FIELD

Embodiments of the present invention relate to the field of servicing software products. In particular, embodiments of this invention relate to updating component-based operating systems and application programs with a service package throughout the software product lifecycle.

BACKGROUND OF THE INVENTION

An operating system image interacts with hardware in a computer to perform a multitude of functions. Conventional computers generally execute the operating system to manage various aspects of the computer as it is running. Typically, the operating system is responsible for managing access to storage devices as well as input and/or output devices, and controlling the execution of one or more additional applications. Before the operating system may be executed by the computer, it typically must be installed on the computer, a process which usually involves copying multiple files from a distribution medium (e.g., a CDROM) onto a storage device (e.g., a hard disk) of the computer.

A typical operating system includes a large number of files which may include instructions and/or data. These instructions, when executed by the computer, provide the operating system functionality. The operating system may be modified (e.g., updated) in any of a wide variety of manners, such as by adding or replacing one or more particular files, by any of a wide variety of people (e.g., a user, administrator, software developer other than the operating system developer, etc.). It becomes difficult to troubleshoot a malfunctioning computer or update the operating system because it is difficult for the user or administrator to know exactly what functionality is or should be installed on the computer.

In existing systems, servicing the binary files that comprise a software product (e.g., the operating system or an application program) is often the most expensive aspect of a software product lifecycle. An exemplary software product lifecycle includes a pre-deployment phase (e.g., pre-installation), a deployment phase (e.g., installation), and a post-deployment phase (e.g., on the running system). The size of the binary files, the amount of binary files that are typically serviced for any single problem, and the different locations of the binary files during each of the software product lifecycle phases make the distribution and creation of the binary files difficult. Also, servicing multiple binaries across the system fails to provide specific information on the current version of any larger aggregated piece of functionality on the system.

For example, when creating a service package to remedy an issue in software code stored in a binary file, existing systems typically create an updated copy of the binary or a patch that modifies the software code without modifying other software. However, existing systems typically require different versions of both the patches and the binary files based on the current phase of the software product lifecycle: one version for pre-deployment, one version for during deployment, and one version for the running system.

In another example, some prior systems provide a "hot" fix (e.g., a patch) for the end user that replaces a single file or library (e.g., library.dll) on a running system or during predeployment. Other systems provide updates during installation by directing the client machine to obtain the updated file or library (e.g., library.dll) from an installation medium or via a network and install the obtained update. However, such systems require separate scripts for each lifecycle phase of the client machine: pre-deployment, deployment, and post-deployment. Further, a change to a single file may necessitate a change to other dependent files. The prior systems fail to provide for intelligent dependency resolution during the update process.

Accordingly, a system for servicing a software product across the entire software product lifecycle is desired to address one or more of these and other disadvantages.

SUMMARY OF THE INVENTION

Embodiments of the invention include updating a software product with a service package. The service package includes one or more files associated with the component and a plurality of instruction sets for installing the files. In an embodiment, the invention determines a state or other operating context associated with the component, selects one of the instruction sets based on the determined state, and applies one or more of the files to the component in accordance with the selected instruction set. For example, the state may correspond to one of the following phases of a software product lifecycle: predeployment of the software product, deployment of the software product, and post-deployment of the software product.

The invention provides a single service package to both consumers and original equipment manufacturers to service a software product during all parts of the software product lifecycle. As software products have more and more binaries to service, the invention reduces the cost of servicing and enables a simple query of the system to determine the version of binaries serviced on the system.

In accordance with one aspect of the invention, a computerized method updates a software product. The method includes defining the software product as a plurality of components. The method also includes accessing one of a plurality of instruction sets associated with a service package based on a lifecycle phase of the software product to be updated. The method also includes modifying at least one of the components in the software product in accordance with the accessed instruction set.

In accordance with another aspect of the invention, a method updates a software product with a service package. The software product includes a plurality of components. Each of the components has a state associated therewith. The state represents an operating context of the component. The service package includes one or more files associated with a selected component. The service package further includes a plurality of instruction sets for installing the files. The method includes determining the state associated with the selected component. The method also includes selecting one of the instruction sets based on the determined state. The method also includes applying one or more of the files to the selected component in accordance with the selected instruction set.

In accordance with yet another aspect of the invention, one or more computer-readable media have computer-executable modules for updating a software product with a service package. The software product includes a plurality of components. Each of the components has a state associated therewith. The state represents an operating context of the component. The service package includes one or more files associated with a selected component. The service package further includes a plurality of instruction sets for installing the files. The modules include a configuration module that determines the state associated with the selected component and selects one of the instruction sets based on the determined state. The modules also include an installation module that modifies the selected component by applying one or more of the files to the selected component in accordance with the instruction set selected by the configuration module.

In accordance with still another aspect of the invention, a method creates a service package for a software product. The software product includes a component that has one of a plurality of lifecycle phases associated therewith. The method includes selecting one or more files for association with the software product. The method also includes storing the selected files on a computer-readable medium. The method also includes storing a plurality of installation scripts on the computer-readable medium. Each of the installation scripts corresponds to one of the lifecycle phases. The installation scripts are executed based on the lifecycle phase of the component to apply the stored, selected files to the software product.

In accordance with yet another aspect of the invention, a service package updates a software product stored on a computer-readable medium. The software product includes a component that has one of a plurality of lifecycle phases associated therewith. The service package includes one or more files for association with the component. The service package also includes a plurality of instruction sets that correspond to the plurality of lifecycle phases of the component. One of the plurality of instruction sets is selected and executed responsive to the lifecycle phase associated with the component to apply the files to the component.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
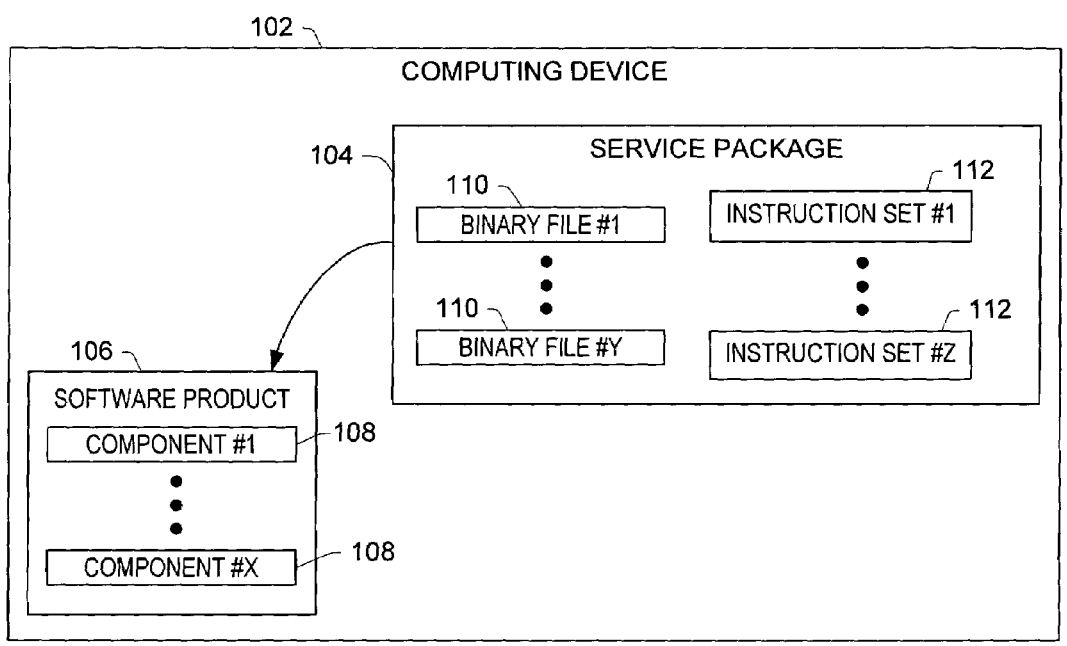
FIG. 1 is a block diagram illustrating an exemplary service package being applied to a software product stored on a computing device.

Referring first to FIG. 1, a block diagram illustrates an exemplary service package 104 applied to a component-based software product 106 having one or more components 108 such as component #1 through component #X stored on a computing device 102. In an embodiment, the invention includes software executing on the computing device 102 to update the software product 106 (e.g., an operating system or an application program). Each component 108 in the software product 106 includes at least one file such as a binary file and has a manifest or other information describing the component 108 associated therewith. The invention uses the component-based definition of the software product 106 to provide a single method for updating the components 108. That is, the invention provides a component installer that applies or otherwise installs all binary files 110 such as binary file #1 through binary file #Y in the service package 104.

The service package 104 also includes a plurality of instruction sets 112 (e.g., including a declarative description of installation steps) such as instruction set #1 through instruction set #Z specifying the proper installation of the files 110 at any phase or state associated with the component 108 in the software product lifecycle. For example, the phases of the software product lifecycle include, but are not limited to, predeployment of the software product 106, deployment of the software product 106, and post-deployment of the software product 106. Other lifecycle phases are within the scope of the invention. The invention applies the files 110 in accordance with the instruction set 112 corresponding to the current lifecycle phase of the software product 106. As such, the invention provides a single service package 104 that enable installation of the service package 104 at any phase, state, or operating context or environment of the software product lifecycle.

In an embodiment, the invention determines the state associated with the component 108, accesses and selects one of the instruction sets 112 based on the determined state, and applies one or more of the files 110 to the component 108 in accordance with the selected instruction set 112 to modify the component 108 (e.g., add or remove components or files in the components). The invention also updates the manifests associated with the updated components 108 with data relating to the update process. A user such as an administrator queries the manifest stored for each of the components 108 to obtain a listing of all versions of all components 108 installed with the software product 106 along with a list of changes that have been made to the software product 106.

The system of FIG. 1 is next described in greater detail.

Componentized Software Product

Figure 2:
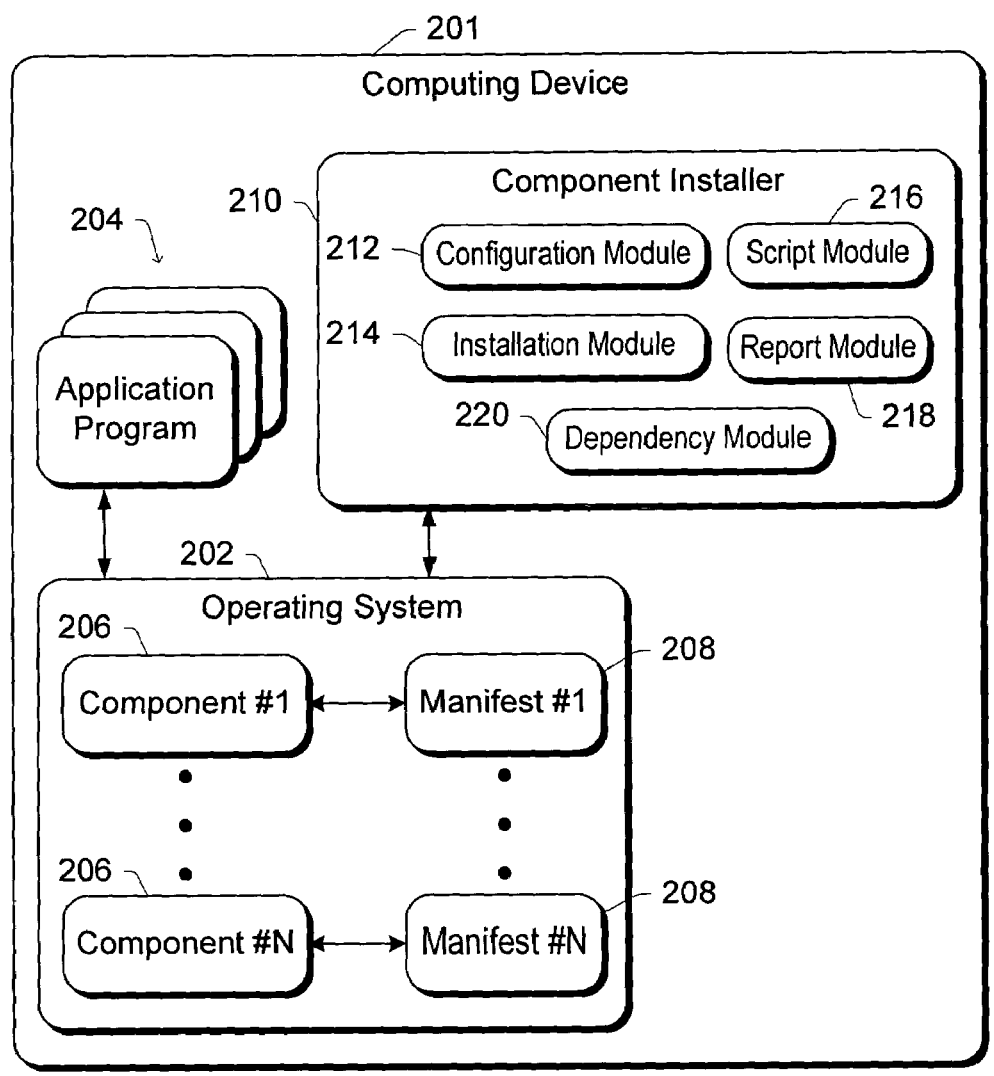
FIG. 2 is an exemplary block diagram illustrating a computing device having a componentized operating system.

Referring next to FIG. 2, a block diagram illustrates an exemplary computing device 201 in accordance with certain embodiments of the invention. The computing device 201 is illustrated as having a software product such as operating system 202 and one or more application programs 204.

Operating system 202 is the fundamental software control program for computing device 201, performing various functions including providing a user interface, managing the execution of one or more applications 204, and controlling the input of data from and output of data to various input/output (I/O) devices. Application programs 204 represent one or more of a wide variety of software application programs that may be executed on computing device 201.

Examples of such application programs 204 include educational programs, reference programs, productivity programs (e.g., word processors, spreadsheets, databases), recreational programs, utility programs (e.g., communications programs), etc. Application programs 204 may be installed on computing device 201 by the user, or alternatively pre-installed by the manufacturer and/or distributor of computing device 201.

Operating system 202 separates its functionality into multiple components 206 such as component #1 through component #N. Each component 206 has a corresponding manifest 208 such as manifest #1 through manifest #N, respectively. The components 206 include a collection of one or more files (or file identifiers). The files may include software instructions such as an executable file, a dynamic-link library (DLL), or a component object module (COM). The files may also include data for use by one or more of the components 206. In one implementation, the files (e.g., data and/or instructions) corresponding to particular functionality of the operating system 202 are grouped together in the same component 206. For example, there may be a games component, a communications component, and a file system component. The grouping of files that result in the componentization may be static or alternatively may change over time. In one example, updates to operating system 202 may result in selected files from certain components 206 being removed and added to other components 206.

Each manifest 208 includes information describing the corresponding component 206. Any of a wide variety of metadata regarding the corresponding component 206 may be included in each manifest 208. In one implementation, the manifest 208 identifies the version of the corresponding component 206 as well as which other components 206, if any, the corresponding component 206 is dependent on. By way of example, in order for one or more files in component 206 to properly execute, one or more other files (e.g., a DLL file) from another component may need to be installed on computing device 201. In this example, manifest 208 would indicate that component 206 depends on the other component.

In one form, one or more computer-readable media associated with computing device 201 have computer-executable modules for updating the software product 106 (e.g., operating system 202) with a service package such as service package 104. The computer-executable modules are embodied as a component installer 210. The component installer 210 includes a configuration module 212, an installation module 214, a script module 216, a report module 218, and a dependency module 220. The configuration module 212 determines the state associated with the component 206 to be updated and selects one of the instruction sets based on the determined state. The installation module 214 modifies the component 206 by applying one or more of the files to the component 206 in accordance with the selected instruction set. The script module 216 updates the manifest 208 for the component 206 with data related to applying the one or more of the files. The script module 216 further stores the updated manifest 208 for the component 206 with component 206. The report module 218 receives a request from a user for data in the manifest 208. The report module 218 further queries the manifest 208 in response to the received request to generate query results and provides the query results to the user. The dependency module 220 resolves dependencies between files in the service package and the component 206 in the software product. Those skilled in the art will note that the modules 212-220 may all be part of the component installer 210 or may be stored in separate application programs or any combination in-between. Further, the modules 212-220 may execute locally or remotely to provide the functionality. The component installer 210 may include additional or less functionality than illustrated and is described herein.

Updating a Component Software Product

Figure 3:
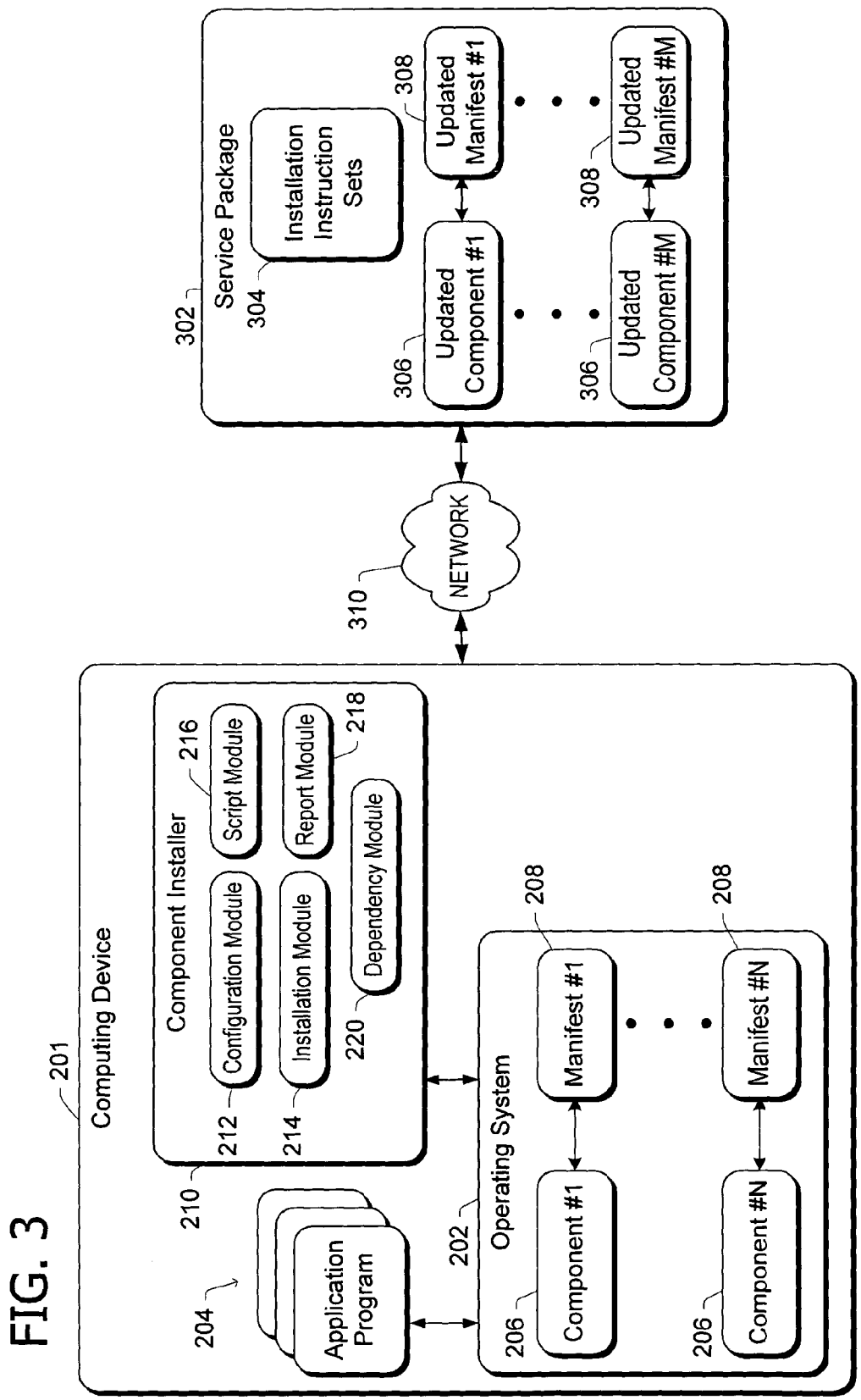
FIG. 3 is an exemplary block diagram illustrating application of an update to a component in the componentized operating system of FIG. 1.

Referring next to FIG. 3, a block diagram exemplifies how a componentized software product may be updated in accordance with certain embodiments of the invention. A computer such as computing device 201, as discussed above with reference to FIG. 2, is illustrated including the componentized operating system 202. A service package 302 is coupled to computing device 201 via a coupling such as network 310. Service package 302 may include any of a variety of sources such as a magnetic disk, an optical disk, flash memory, and a solid-state disk. Additionally, service package 302 may be local (e.g., a disk that is accessed by a disk drive of computing device 201) or remote (e.g., a disk at a remote server accessed over network 310). Those skilled in the art will note that the exact nature of the coupling between the service package 302 and computing device 201 is dependent on the nature of service package 302 (e.g., the coupling may include a bus connecting a disk drive to computing device 201, a modem and telephone line, a network adapter and network, or a combination of any of these).

Service package 302 includes a plurality of installation instruction sets 304. As described previously, each of the instruction sets 304 corresponds to a state or phase of the components to be updated (e.g., components 206) in the software product lifecycle. The instruction sets 304 include computer-executable instructions (e.g., software code or scripts) or declarative installation steps which are followed by an application program such as component installer 210 in FIG. 2 during the update process. The service package 302 further includes updated components 306 such as updated component #1 through updated component #M. The service package 302 stores updated manifests 308 such as updated manifest #1 through updated manifest #M corresponding, respectively, to the updated components 306. Although the installation instruction sets 304, updated components 306, and updated manifests 308 are illustrated together in service package 302, alternatively any one or more of the installation instruction sets 304, updated components 306, and updated manifests 308 may be stored at different locations (either remote or local to computing device 201).

The installation instruction sets 304 identify the components 306 that are updates for operating system 202 (e.g., including the versions of components 306). During an update process, assuming that the new components 306 have not already been installed as one of components 206, the updated components 306 and corresponding manifests 308 replace or supplement the corresponding components 206. By way of example and not limitation, component 306 is a newer version of component 206. In this situation, component 306 and manifest 308 would replace component 206 and manifest 208, respectively, in operating system 202. Component 306 may replace component 206 by simply overwriting one or more of the files in component 206 by one or more of the files in updated component 306 (the overwritten files may optionally be saved elsewhere before being overwritten). In a similar example, if manifest 308 indicates that component 306 lacks a file that currently exists in component 206 (e.g., as indicated by reviewing manifest 208), the file is deleted from the computer-readable medium storing operating system 202 during the update process.

In another embodiment, the files in updated component 306 may simply be a reference to other files. For example, to minimize the size of service package 302 and to ensure that the latest updated components 306 are installed, the updated components 306 may include hyperlinks to the actual files to be installed. The component installer 210 downloads the files associated with the updated components 306 during the update process.

The operating system 202 may be updated for any of a wide variety of reasons. For example, bug fixes to certain files of certain components may be available, new functionality (e.g., replacement or additional files) for component 206 may be available, or new components 306 may be available.

Additionally, a new component 306 may be installed as part of the operating system 202 in addition to a previous component 206 rather than in place of the previous component 206. In this example, the manifest 208 is modified to indicate that both the new component 306 and the previous component 206 are installed. This allows different applications to use whichever version of the components 206, 306 they prefer (or are programmed to use). Those skilled in the art will note that in some embodiments, the instruction sets 304 are part of the manifests 308 for each component. In this manner, the component installer accesses each manifest 308 to determine how to install the component 306 associated therewith.

Operation of the Component Installer

Figure 4:
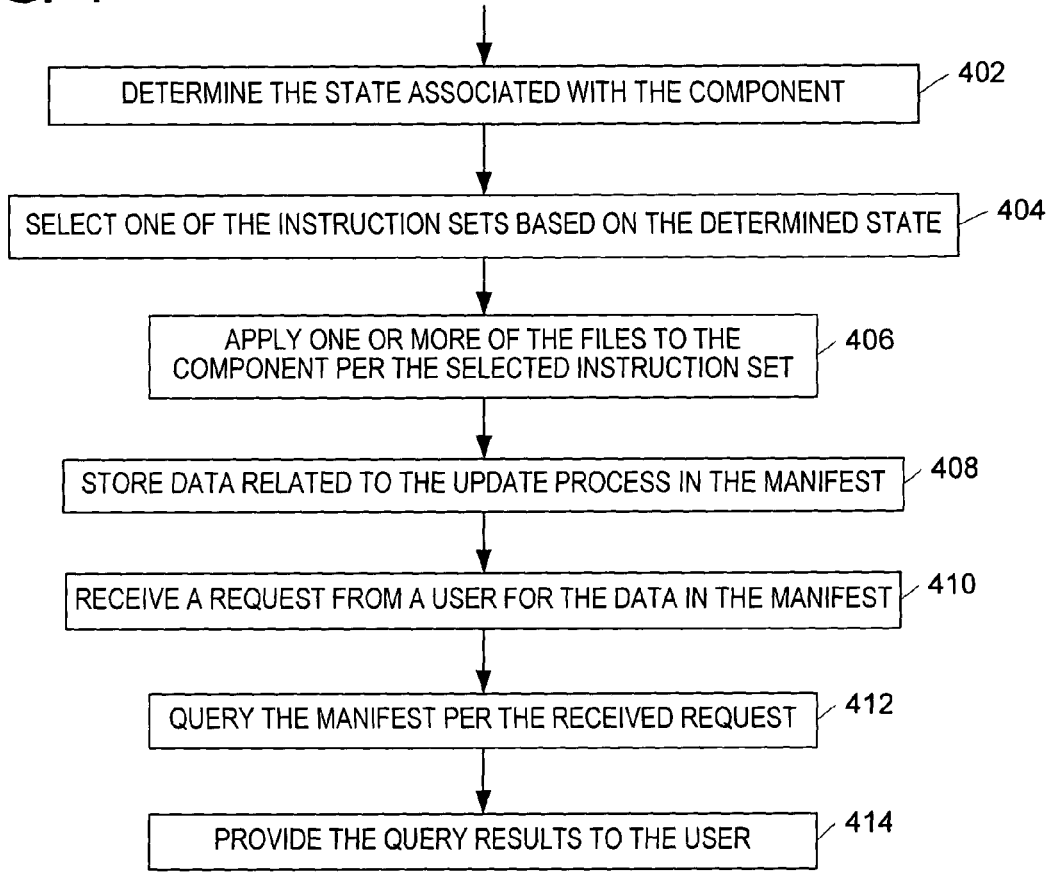
FIG. 4 is an exemplary flow chart illustrating operation of a component installer application program.

Referring next to FIG. 4, an exemplary flow chart illustrates operation of the component installer. The process of FIG. 4 is implemented by an application program such as component installer 210 that may be executed on a computer such as computing device 201 or alternatively on another computer coupled to the computer. The component installer may be part of the software product (e.g., operating system 202) being updated or, alternatively, a separate application. The update process of FIG. 4 may be performed in software, hardware, firmware, or a combination thereof.

The update process includes receiving the service package, determining the state associated with the component at 402, selecting one of the instruction sets based on the determined state at 404, and applying one or more of the files to the component in accordance with the selected instruction set at 406. Applying the files includes copying each of the files from the service package to the computer-readable medium storing the component and integrating the copied files with the component. Alternatively or in addition, applying the files includes performing a file action and/or a data action. Performing the file action includes copying, deleting, and replacing files. Performing the data action includes updating a system setting such as a registry entry.

The update process further includes updating the manifest for the component with data related to applying the one or more of the files and storing the updated manifest for the component with the component at 408. The stored data comprises at least one of the following: a version number, an update time, a description of the service package, a description of the changes made to the component, the current lifecycle phase of the software product, and a storage location of the component. The update process further includes receiving a request from a user for the data in the manifest at 410, querying the manifest in response to the received request to generate query results at 412, and providing the query results to the user at 414.

The update process also resolves dependencies between the updated components and the existing components in the software product. Dependency resolution includes accessing the selected instruction set to identify one or more additional components dependent on or by the updated component. As a result of the dependency resolution, the component installer may request and receive additional components as needed.

One or more computer-readable media have computer-executable instructions for performing the method illustrated in FIG. 4.

Creating the Service Package

Figure 5:
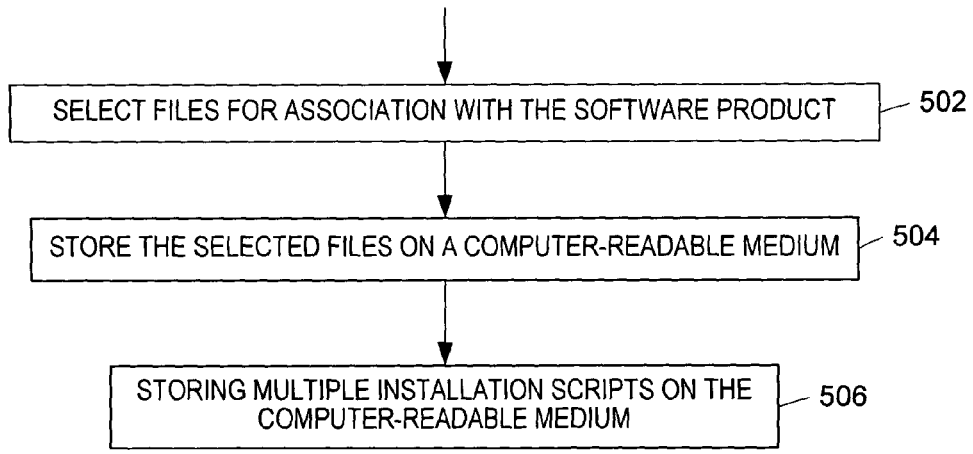
FIG. 5 is an exemplary flow chart illustrating creation of a service package.

Referring next to FIG. 5, an exemplary flow chart illustrates creation of a service package. An original equipment manufacturer (OEM), vendor, system administrator, independent software vendor, or other user creates the service package for distribution on a computer-readable medium or over a network. The method includes selecting one or more files for association with the software product at 502 and storing the selected files on a computer-readable medium 504. The method also stores a plurality of installation scripts on the computer-readable medium at 506. Each of the installation scripts corresponds to one of the states of the components to be updated. The installation scripts are executed based on the state of the component to apply the stored, selected files to the software product. One or more computer-readable media have computer-executable instructions for performing the method illustrated in FIG. 5.

Exemplary Operating Environment

Figure 6:
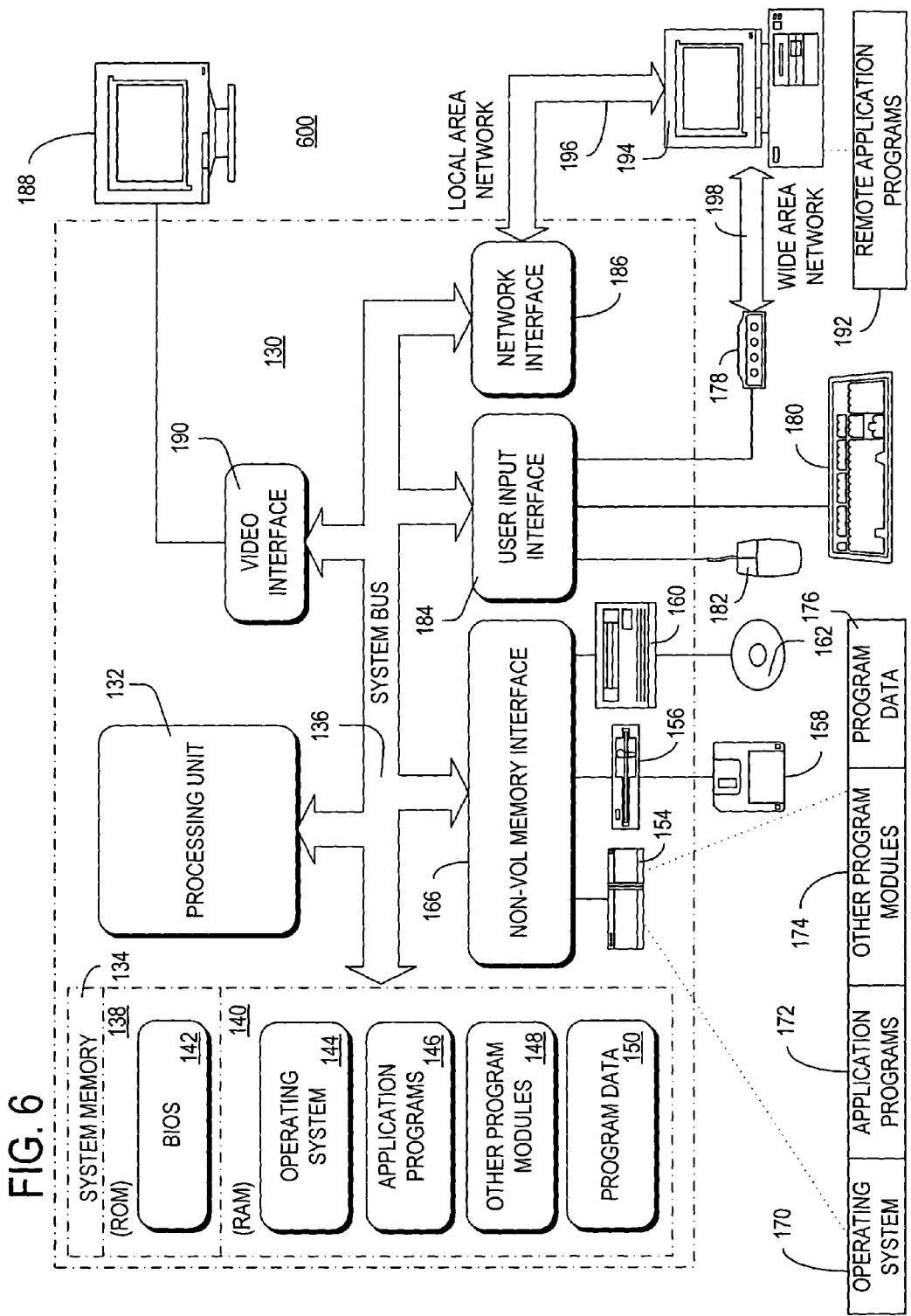
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4 to update the software product.

EXAMPLES

The following examples further illustrate the invention. The exemplary manifest listed below defines locations for the file to be updated based on the current state of the installed component (e.g., source or run-time) as determined by the component installer. In the example below, NetworkComponent represents a collection of functionality. Further, version 1.1 indicates that this is an upgrade for NetworkComponent, which is dependent on version 1.0 or later of CoreOperatingSystemComponent.

```
<identity>
    <name>NetworkingComponent<\name>
    <version>1.1<\version>
</identity>
<files>
    fileA.dll
<\files>
<install>
    <source>%sourcepath%fileA.dl_<\source>
    <run-time>%rundir%/fileA.dll<\run-time>
<\install>
<dependencies>
    CoreOperatingSystemComponent
    version >= 1.0
<\dependencies>
```

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computerized method of updating a software product, the method comprising:
    defining the software product as a plurality of components, said software product having a plurality of lifecycle phases, each component having a manifest associated therewith, said manifest including different storage locations of the associated component for different lifecycle phases;
    accessing one of a plurality of instruction sets associated with a service package based on a lifecycle phase of the software product to be updated;
    modifying at least one of the components at the location specified by the manifest based on the lifecycle phase of the software product to be updated in the software product in accordance with the accessed instruction set; and
    updating the manifest of each modified component responsive to said modifying.

2. The computerized method of claim 1, wherein modifying the component in the software product comprises removing one or more components from the software product.

3. The computerized method of claim 1, wherein modifying the component in the software product comprises adding one or more components to the software product.

4. The computerized method of claim 1, wherein each of the plurality of instruction sets corresponds to at least one of the following lifecycle phases: predeployment of the software product, deployment of the software product, and post-deployment of the software product.

5. A method of updating a software product with a service package, said software product comprising a plurality of components, each of said components having a state associated therewith and having a manifest associated therewith, said manifest including different storage locations of the associated component for different states, said service package comprising one or more files associated with a selected component, said service package further comprising a plurality of instruction sets for installing said files, said method comprising:
    determining the state associated with the selected component, said state representative of an operating context of the component;
    selecting one of the instruction sets based on the determined state;
    applying one or more of the files to the selected component in accordance with the selected instruction set; and
    storing the selected component at the location specified by the manifest based on the state of the software product to be update.

6. The method of claim 5, further comprising defining the state associated with the selected component with a manifest associated therewith.

7. The method of claim 6, wherein the components are stored on a computer-readable medium, and further comprising:

updating the manifest for the selected component with data related to applying the one or more of the files; and
storing the updated manifest for the selected component on the computer-readable medium.

8. The method of claim 7, wherein updating the manifest comprises updating the manifest for the selected component with at least one of the following: a version number, an update time, a description of the service package, and a description of the changes made to the component.

9. The method of claim 7, further comprising:
receiving a request from a user for the data in the updated manifest for the selected component;
querying the updated manifest in response to the received request to generate query results; and
providing the query results to the user.

10. The method of claim 6, wherein the manifest defines at least one of the following: a lifecycle phase of the software product and a storage location of the component.

11. The method of claim 5, wherein the component is stored on a computer-readable medium, and wherein applying the one or more of the files comprises copying each of the files from the service package to the computer-readable medium and integrating the copied files with the component.

12. The method of claim 5, wherein the service package comprises one or more update components, each of said update components having an update manifest associated therewith, said update manifest comprising a plurality of instruction sets for installing the associated update component.

13. The method of claim 5, wherein each of the plurality of instruction sets corresponds to at least one of the following phases: predeployment of the software product, deployment of the software product, and post-deployment of the software product.

14. The method of claim 5, wherein the software product comprises at least one of an operating system and an application program.

15. The method of claim 5, wherein applying one or more of the files to the selected component comprises applying one or more of the binary files to the selected component.

16. The method of claim 5, further comprising:
receiving the service package, said service package comprising an updated component; and
resolving dependencies between the received, updated component and the selected component in the software product.

17. The method of claim 16, further comprising receiving additional components identified during said resolving dependencies.

18. The method of claim 16, wherein resolving dependencies comprises accessing the selected instruction set to identify an additional component dependent on the updated component.

19. The method of claim 18, further comprising obtaining the additional component, and wherein applying the one or more of the files comprises applying the updated component and the obtained, additional component to the software product.

20. The method of claim 5, wherein applying the one or more of the files comprises performing at least one of the following: a file action and a data action.

21. The method of claim 20, wherein performing the file action comprises at least one of the following: copying, deleting, and replacing the files.

22. The method of claim 20, wherein performing the data action comprises updating a system setting.

23. The method of claim 22, wherein updating the system setting comprises updating a registry entry.

24. One or more computer-readable storage media having computer-executable instructions for performing the method of claim 5.

25. One or more computer-readable storage media having computer-executable modules for updating a software product with a service package, said software product comprising a plurality of components, each of said components having a state associated therewith and having a manifest associated therewith, said manifest including different storage locations of the associated component for different states, said service package comprising one or more files associated with a selected component, said service package further comprising a plurality of instruction sets for installing said files, said modules comprising:
a configuration module for determining the state associated with the selected component, said state representing an operating context of the component, and selecting one of the instruction sets based on the determined state; and
an installation module for modifying the selected component by applying one or more of the files to the selected component in accordance with the instruction set selected by the configuration model, said installation module storing the modified component at the location specified by the manifest based on the state of the software product to be update.

26. The computer-readable storage media of claim 25, wherein the selected component has a manifest associated therewith, said manifest defining the state associated with the component.

27. The computer-readable storage media of claim 26, wherein the components are stored on a computer-readable medium, and further comprising a script module for:
updating the manifest for the selected component with data related to applying the one or more of the files by the installation module; and
storing the updated manifest for the selected component on the computer-readable medium.

28. The computer-readable storage media of claim 27, further comprising a report module for:
receiving a request from a user for data in the updated manifest for the selected component;
querying the updated manifest in response to the received request to generate query results; and
providing the query results to the user.

29. The computer-readable storage media of claim 25, wherein the service package comprises an updated component, and further comprising a dependency module for resolving dependencies between the updated component and the selected component in the software product.

30. The computer-readable storage media of claim 25, wherein each of the plurality of instruction sets corresponds to at least one of the following phases:
predeployment of the software product, deployment of the software product, and post-deployment of the software product.

31. The computer-readable storage media of claim 25, wherein the software product comprises at least one of an operating system and an application program.

32. A service package for updating a software product stored on a computer-readable storage medium, said software product comprising a component having one of a plurality of lifecycle phases associated therewith, said service package comprising:

one or more files for association with the component, wherein the software product includes a plurality of versions of the component each corresponding to at least one of the plurality of lifecycle phases, wherein the component has a manifest associated therewith, and wherein the manifest includes different storage locations of the component for different lifecycle phases; and a plurality of computer-executable instruction sets corresponding to the plurality of lifecycle phases of the component, wherein one of the plurality of instruction sets is selected and executed responsive to the corresponding lifecycle phase of the component to apply the files to the corresponding location of the component specified by the manifest, wherein the manifest of the component is updated responsive to the application of the files to the corresponding version of the component.

33. The service package of claim 32, wherein one of the plurality of instruction sets applies the files to the component by copying each of the files from the service package to the computer-readable medium and integrating the copied files with the component.

34. The service package of claim 32, wherein the lifecycle phases correspond to at least one of the following: predeployment of the software product, deployment of the software product, and post-deployment of the software product.

35. The service package of claim 32, wherein the software product comprises at least one of an operating system and an application program.

36. The service package of claim 32, wherein the files comprise binary files.

37. The service package of claim 32, wherein the file comprises a reference to another file.

* * * * *